(12) United States Patent
Quehenberger

(10) Patent No.: US 8,672,094 B2
(45) Date of Patent: Mar. 18, 2014

(54) TRANSMISSION WITH LUBRICATION DEVICE

(75) Inventor: Johannes Quehenberger, Saalbach (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 702 days.

(21) Appl. No.: 12/688,995

(22) Filed: Jan. 18, 2010

(65) Prior Publication Data

US 2010/0180721 A1    Jul. 22, 2010

(30) Foreign Application Priority Data

Jan. 19, 2009  (DE) .......................... 10 2009 005 077

(51) Int. Cl.
*F16H 57/02*       (2012.01)

(52) U.S. Cl.
USPC ....................................................... 184/6.12

(58) Field of Classification Search
None
See application file for complete search history.

(56) References Cited

U.S. PATENT DOCUMENTS

| | | | | |
|---|---|---|---|---|
| 3,529,698 | A * | 9/1970 | Nelson | 184/6.12 |
| 4,630,711 | A * | 12/1986 | Levrai et al. | 184/6.12 |
| 4,721,184 | A * | 1/1988 | Sowards | 184/6.12 |
| 4,736,819 | A * | 4/1988 | Muller | 184/6.12 |
| 5,072,784 | A * | 12/1991 | Stenlund | 165/47 |
| 5,301,642 | A | 4/1994 | Matsushiro et al. | |
| 6,299,561 | B1 * | 10/2001 | Kramer et al. | 475/160 |
| 6,644,439 | B2 * | 11/2003 | Schnitzer | 184/11.1 |
| 6,997,284 | B1 * | 2/2006 | Nahrwold | 184/6.12 |
| 7,213,682 | B2 * | 5/2007 | Gibson et al. | 184/6.12 |
| 8,302,506 | B2 * | 11/2012 | Iwata et al. | 74/606 R |

FOREIGN PATENT DOCUMENTS

| | | |
|---|---|---|
| DE | 1801917 A1 | 5/1970 |
| DE | 19912327 A1 | 9/2000 |
| DE | 10258504 A1 | 7/2004 |
| EP | 0067639 A2 | 12/1982 |
| EP | 1918613 A2 | 5/2008 |
| FR | 2757922 A1 | 7/1998 |
| JP | 55054618 A | 4/1980 |
| JP | 2006002872 A | 1/2006 |

OTHER PUBLICATIONS

Joe Palazzolo; 2006 Lexus RX400h; 8 pages.
German Search Report for German Patent Application No. 10 2009 005 077.9 dated Jul. 3, 2009 with English translation.

* cited by examiner

*Primary Examiner* — William E Dondero
*Assistant Examiner* — Mark K Buse
(74) *Attorney, Agent, or Firm* — Dickinson Wright PLLC

(57) ABSTRACT

The invention relates to a transmission for a motor vehicle having a rotatable transmission element arranged in a first section of the transmission; a store of liquid arranged in a second section of the transmission separate from the first section; a collection device for liquid thrown off by the transmission element having a return passage through which a first portion of the thrown off liquid can be returned to the first transmission section and an outlet to supply a second portion of the thrown off liquid back to the liquid store; and a passage for the liquid which connects the liquid store to the first transmission section and which has a temperature-controlled restrictor element functioning to inhibit the inflow of liquid from the liquid store into the first transmission section when a fluid temperature in the first transmission section falls below a temperature threshold value.

18 Claims, 4 Drawing Sheets

TRANSMISSION WITH LUBRICATION DEVICE

CROSS-REFERENCE TO RELATED APPLICATIONS

This application claims the benefit and priority of German Application No. DE 10 2009 005 077.9, filed Jan. 19, 2009. The entire disclosure of the above application is incorporated herein by reference.

FIELD

The present disclosure relates to a transmission, in particular for a motor vehicle, having a transmission element which can be rotated for the transfer of torque and which is arranged in a first section of a transmission, and having a store for a liquid for the lubrication and cooling of the transmission element.

BACKGROUND

This section provides background information related to the present disclosure which is not necessarily prior art.

In known transmissions of this kind, the transmission lubrication and transmission cooling are typically adapted to particularly high speeds of rotation and/or for particularly high temperatures. Known transmissions usually have optimum efficiency at an operating temperature in the range of 70° C. to 90° C. since the liquid lubricant, usually a lubrication oil, has sufficiently low viscosity with simultaneously sufficiently good lubrication capability in this temperature range and the liquid lubricant as well as also other components of the transmission are characterized by a particularly good service life in this temperature range. At transmission temperatures below the optimum operating temperature range, the transmission efficiency is reduced due to increased churning losses which result from a higher viscosity of the liquid lubricant.

As is known, the operating temperature of a motor vehicle transmission is influenced by head wind cooling. The heat dissipation achieved by the head wind cooling is thus dependent on the vehicle speed and on the external temperature and is configured in practice to high external temperatures and to a simultaneously high power introduction into the transmission, e.g. at low driving speeds such as on mountain passes or on desert trips.

It has proven problematic with known transmissions which are used in motor vehicles that the optimum operating temperature range is as a rule only reached after some journey time. In this respect, the journey time required to achieve the optimum operating temperature range is typically considerably longer than the duration of test cycles for the standardized determination of the fuel consumption and/or of the pollutant emission. The determination of the fuel consumption or of the pollutant emission in other words does not usually take place in the optimum operating state of the transmission. It can furthermore also occur in practice that, with a slower manner of driving which is more favorable for consumption and/or at particularly low external temperatures, the optimum operating temperature range, and thus the optimum transmission efficiency, are only reached very late if at all.

SUMMARY

This section provides a general summary of the disclosure and is not intended to be a comprehensive disclosure of its full scope or all of its features.

It is an underlying object of the invention to provide a transmission which already has better efficiency at a lower load and/or during the warm-up phase.

The transmission in accordance with the invention includes a transmission element which can be rotated for the transfer of torque and which is arranged in a first section of the transmission; a store for a liquid for the lubrication and cooling of the transmission element, said store being arranged in a second section of the transmission separate from the first section; a collection apparatus for liquid lubricant thrown off by the transmission element, wherein the collection apparatus includes a return passage through which a first portion of the thrown off liquid lubricant can be returned into the first transmission section and an outlet to conduct a second portion of the thrown off liquid lubricant into the liquid lubricant store; and a passage for the liquid lubricant which connects the liquid lubricant store to the first transmission section and which has a temperature-controlled restrictor element which substantially prevents the inflow of liquid lubricant from the liquid lubricant store into the first transmission section at a temperature in the first transmission section falling below a temperature threshold value and enables it at a temperature in the first transmission section lying above the temperature threshold value.

It is the underlying general idea of the invention to divide the transmission into two temperature regions which essentially correspond to the first and second transmission sections. The transmission element provided for the torque transfer, in other words a power-conducting part of the transmission, is located in the first transmission section. The first transmission section is thus that section of the transmission into which heat energy is introduced during operation and in which an optimum operating temperature range is reached as fast as possible on a cold start and should be maintained as uniformly as possible during operation so that the transmission is in an optimum efficiency range as fast and as permanently as possible. The first transmission section should be designed as small and as light as possible for the fast heating of the transmission to the ideal operating temperature range.

The second transmission section in particular includes all those parts of the transmission whose temperature at least does not substantially influence the transmission efficiency. A heat dissipation into the environment, for example by means of head wind cooling, also preferably takes place via the second transmission section.

The liquid lubricant, e.g. a transmission oil, serves for the heat transfer between the first transmission section and the second transmission section, with the liquid lubricant flow between the first transmission section and the second transmission section being designed with the aid of the temperature-controlled restrictor element in dependence on the temperature.

Since the restrictor element substantially prevents the inflow of liquid lubricant from the liquid lubricant store into the first transmission section at a temperature in the first transmission section falling below a temperature threshold value and only allows a significant liquid lubricant flow between the first transmission section and the second transmission section on an increase in the temperature in the first transmission section beyond the temperature threshold value, an exchange of liquid lubricant which is present in the first transmission section to ensure a minimum lubrication and of the liquid lubricant stored in the liquid lubricant store is at least largely prevented during a cold start of the transmission and/or at particularly low environmental temperatures.

At the same time, the liquid lubricant thrown off by the transmission element is collected by the collection device and is returned back into the first transmission section through the return passage, which results in a closed lubrication circuit within the first transmission section under cold start conditions. Heat arising due to losses thereby remains close to the parts of the transmission whose efficiency becomes better at warmer temperatures, in particular in the liquid lubricant in the first transmission section or also close to a support for a driven part whose bias can be temperature dependent.

The liquid lubricant present in the first transmission section is heated to its optimum operating temperature particularly fast in this manner by the heat introduced by the transmission element, whereby the transmission reaches its optimum efficiency particularly fast and both the fuel consumption and the pollutant emission are reduced overall.

If the temperature in the first transmission section exceeds the preset temperature threshold value, the restrictor element opens the passage connecting the liquid lubricant store to the first transmission section, whereby colder liquid lubricant can flow out of the store into the first transmission section and can mix with the warmer liquid lubricant in the first transmission section. The optimum operation temperature can also be maintained under increased load conditions in the first transmission section due to the cooling of the liquid lubricant in the first transmission section thus achieved.

The amount of liquid lubricant in the first transmission section increases by the liquid lubricant additionally flowing into the first transmission section. This has the result that the liquid lubricant thrown off by the transmission element is not completely collected by the collection apparatus and is returned into the first transmission section, but rather that a portion of the thrown off liquid lubricant is conducted off into the liquid lubricant store. The heat introduced by the thrown off liquid lubricant can then be led off from it.

In accordance with one embodiment, the restrictor element is formed by an orifice changing the passage cross-section and in particular by a bimetallic element, e.g. a bimetallic platelet, changing the passage cross-section. In this respect, it is a particularly simple form of a passive restrictor element since the bimetallic element so-to-say automatically changes the passage cross-section in dependence on the temperature.

In accordance with another embodiment, the restrictor element can be formed by the passage itself. To be able to act as a restrictor element, the passage must be adapted to the liquid lubricant and in particular to its viscosity such that at lower temperatures, as in the case of a cold start, at least no substantial quantity of liquid lubricant can pass through the passage due to the increased viscosity of the liquid lubricant, but, at a sufficient temperature heating and a reduction in the viscosity of the liquid lubricant which accompanies this, a significant flow of liquid lubricant can take place from the store into the first transmission section. A passage formed in this manner is likewise a passive restrictor element which automatically controls the liquid lubricant flow in dependence on the temperature. To amplify the restrictor effect of the passage even further, it can have a labyrinthine shape.

It is generally also conceivable to provide the restrictor element in the form of a magnetic valve which is controlled by a controller coupled to a sensor for the measurement of the temperature in the first transmission section. In this case, the restrictor element would be an active element for whose actuation a separate controller would have to be provided which could e.g. be integrated into an engine controller. Further forms of temperature controlled restrictor elements which may likewise be used are known, for example, from the field of thermostats.

In accordance with a further embodiment, the collection apparatus is arranged in an upper region of the transmission, in particular in the region of an upper section of the transmission element and preferably above the liquid lubricant store. The liquid lubricant overflowing the collection apparatus can hereby run off into the liquid lubricant store in a particularly simple manner.

In accordance with yet a further embodiment, the passage for the liquid lubricant provided with the restrictor element is arranged in a lower region of the transmission. In this manner, the pressure generated by the liquid column in the liquid lubricant store contributes to the fact that the liquid lubricant can flow independently from the liquid lubricant store into the first transmission section.

The quantity of liquid lubricant present in the liquid lubricant store is advantageously larger than the quantity of liquid lubricant present in the first transmission section. Due to its larger thermal mass, the liquid lubricant present in the liquid lubricant store does not heat up as fast as the liquid lubricant present in the first transmission section so that the liquid lubricant from the liquid lubricant store can be used for the regulation of the optimum operating temperature in the first transmission section.

To keep the temperature of the liquid lubricant present in the liquid lubricant store permanently at a value reduced in comparison with the temperature of the liquid lubricant in the first transmission section, the liquid lubricant store can be partly bounded by a wall, in particular by a wall provided with cooling fins, of a housing of the transmission.

The first transmission section preferably has a thermally insulating material. A wall of a housing of the transmission bounding the first transmission section can in particular be at least regionally lined with a thermally insulating material. The insulation of the housing wall reduces the mass to be heated in the first transmission section, which contributes to an even faster heating of the first transmission section to the optimum operating temperature and thus ultimately to an even faster reaching of an optimum transmission efficiency.

To minimize the volume of the first transmission section and thereby to achieve an even faster heating of the first transmission section to the optimum operating temperature, the first transmission section can be separated from the liquid lubricant store by an encapsulation surrounding the transmission element. The encapsulation preferably simultaneously effects a thermal insulation of the first transmission section in this respect. For this purpose, the encapsulation itself can be formed from a thermally insulating material.

Further areas of applicability will become apparent from the following description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The invention will be described in the following purely by way of example with reference to advantageous embodiments and to the enclosed drawing.

Figure 5:
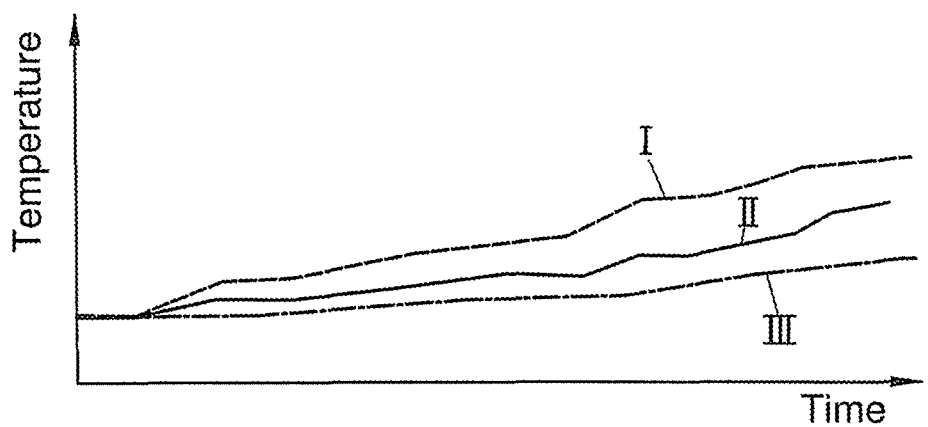
Figure 6:
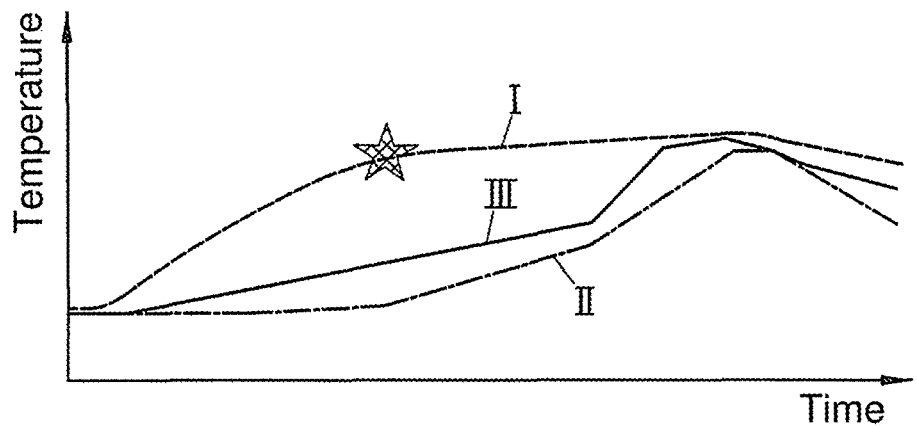

FIG. 5 is a graph illustrating the time-dependent course of the temperature (I) in a power-conducting first transmission section of a transmission in accordance with the invention, (II) in a second transmission section of the transmission in accordance with the invention and (III) in a conventional transmission with standard lubrication or standard cooling during a $CO_2$ measurement cycle; and FIG. 6 is a graph illustrating the time dependent course of the temperatures shown in FIG. 5 during a cycle with a higher load of the respective transmission.

Corresponding reference numerals indicate corresponding parts throughout the several views of the drawings.

DETAILED DESCRIPTION

Exemplary embodiments will now be described more fully with reference to the accompanying drawings.

Figure 1:
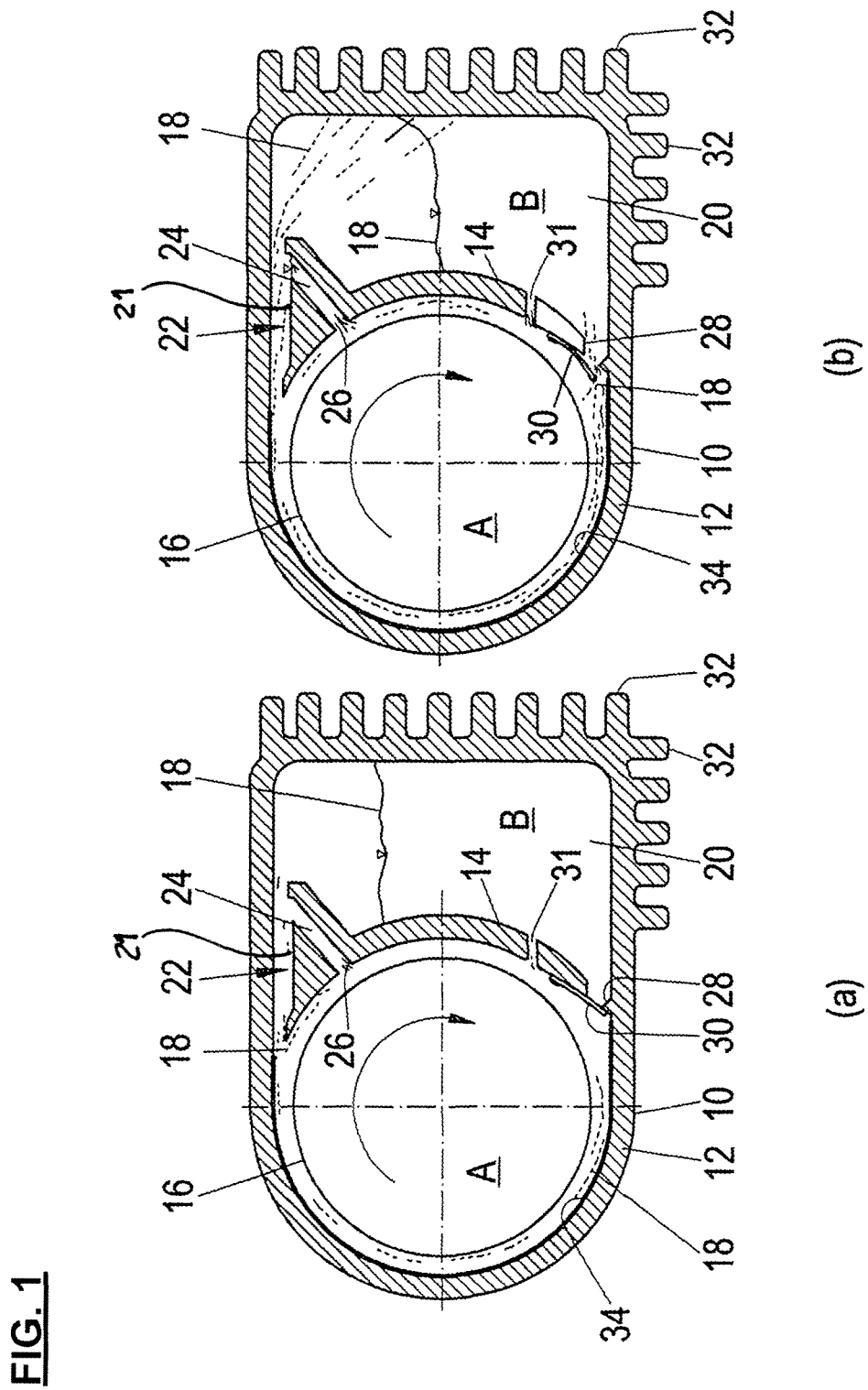
FIG. 1 is a cross-sectional view of a first embodiment of a transmission in accordance with the invention (a) before reaching an optimum operating temperature and (b) after reaching the optimum operating temperature.

A first embodiment of a transmission in accordance with the invention is shown in FIG. 1, with it in this respect being the transmission of a motor vehicle. The transmission includes a housing 10 having a housing wall 12 and a partition wall 14 which divides the interior of the housing 10 into a first transmission section A and a second transmission section B.

A rotatably journalled transmission element 16, which can, for example, be a crown wheel of a differential or a clutch drum, is arranged in the first transmission section A for the transfer of torque. Due to the transmission element 16, the first transmission section A is also called a power-conducting region of the transmission.

The transmission element 16 has to be lubricated and cooled during the transmission operation. To achieve optimum transmission efficiency, the first transmission section A should be kept as constantly as possible at an increased optimum operating temperature, e.g. in the range of 70° C. to 90° C. So that the optimum transmission efficiency is reached as fast as possible on a cold start, the first transmission section A should additionally be brought to its optimum operating temperature as fast as possible.

A liquid lubricant 18, for example a transmission oil, is provided for the lubrication and cooling of the transmission element 16 or for the temperature control of the first transmission section A. The main portion of the liquid lubricant 18 is present in the second transmission section B which serves as a whole as a liquid lubricant store 20 in the embodiment shown in FIG. 1. Only a small portion of the liquid lubricant 18 is present in the first transmission section A to lubricate and cool the transmission element 16. Churning looses are minimized due to the storage of the main portion of the liquid lubricant 18 in the liquid lubricant store 20.

During the transmission operation, liquid lubricant 18, which has collected in a lower region of the first transmission section A, is conveyed upwardly by the rotating transmission element 16 and is thrown off in an upper region of the first transmission section A. A large portion of the liquid lubricant 18 thrown off by the transmission element 16 is collected in a collection reservoir 21 associated with a collection device 22 integrated in the partition wall 14.

The collection device 22 also includes a return passage 24 whose minimal opening cross-section is defined by an orifice 26 which is as independent of temperature as possible, with the return passage 24 serving to return a first portion of the collected liquid lubricant 18 from the collection reservoir 21 into the active lubrication circuit of the first transmission section A. It is hereby achieved that already heated liquid lubricant 18 remains in the lubrication circuit in the first transmission section A and can heat up even further, whereby the optimum operating temperature of the first transmission section A is reached within a very short time, starting from cold-start conditions.

A portion of the liquid lubricant 18 returned through the return passage 24 of the collection device 22 into the lubrication circuit of the first transmission passage A can be branched off—either before or after the orifice 26—and can be supplied to a further part of the transmission, e.g. of a multidisk clutch, not shown.

The second transmission section B will only heat up a little during the warm-up phase of the first transmission section A. The warming up of the second transmission section B is mainly caused by heat conduction, in particular via the partition wall 14, and to a small degree also by hot liquid lubricant 18 which is thrown off by the rotating transmission element 16 and moves past the collection device 22 into the liquid lubricant store 20.

In a lower region of the partition wall 14, a passage 28 is formed which connects the liquid lubricant store 20 to the first transmission section A. In the region of the end of the passage 28 facing the first transmission section A, a temperature-controlled restrictor element 30 is arranged; in the present embodiment a bimetallic platelet which is configured such that it at least substantially prevents a flow of liquid lubricant 18 from the liquid lubricant store 20 into the first transmission section with an insufficiently heated transmission, e.g. in cold-start conditions.

As soon as the liquid lubricant 18 present in the first transmission section A has exceeded a specific temperature threshold value, the restrictor element 30 releases the passage 28 so that cooler liquid lubricant 18 can subsequently flow out of the liquid lubricant store 20 into the first transmission section A. An optimum operating temperature, which contributes to optimum transmission efficiency, is adopted in the first transmission section A due to the mixing of warmer liquid lubricant 18 and subsequently flowing cooler liquid lubricant 18.

The restrictor element 30 can be designed so that, on a low load of the transmission and/or at particularly low environmental temperatures, it never opens the passage 28 and/or only partly releases the passage 28 on a normal load of the transmission.

To ensure a minimum lubrication of the transmission element 16, a small lubrication passage 31 is provided in the partition wall 14 through which a small quantity of liquid lubricant 18 can always flow out of the liquid lubricant store 20 into the first transmission section A.

With a restrictor element 30 designed in the form of a bimetallic plate, the formation of the lubrication passage 31 is, however, not absolutely necessary since such a restrictor element 30 is also not able to close the passage 28 100% at low temperatures due to the principle used. In this manner, a small quantity of liquid lubricant 18 can also always flow into the first transmission section A at temperatures below the temperature threshold value to ensure a minimum lubrication.

As already mentioned, a portion of the liquid lubricant 18 thrown off by the rotating transmission element 16 is collected by the collection device 22 and returned from the collection reservoir 21 through the return passage 24 into the lubrication circuit of the first transmission section A. Since the liquid lubricant quantity in the first transmission section A increases when the passage 28 is open, a larger proportion of liquid lubricant 18 will overflow from the collection device 22 and will flow back into the liquid lubricant store 20.

In the liquid lubricant store 20, the heated liquid lubricant 18 emits heat, whereby not only the remaining liquid lubricant 18 present in the liquid lubricant store 20 is heated, but also the housing 10. To be able to dissipate the heat introduced into the liquid lubricant store 20 better to the environment, a plurality of cooling fins 32 are formed at an outer side of the section of the housing wall 12 bounding the liquid lubricant store 20.

So that the temperature in the first transmission section A reaches the optimum operating temperature of the transmission even faster, a section of the housing wall 12 bounding the first transmission section A is lined with a thermal insulation layer 34 which reduces the mass to be heated.

Figure 2:
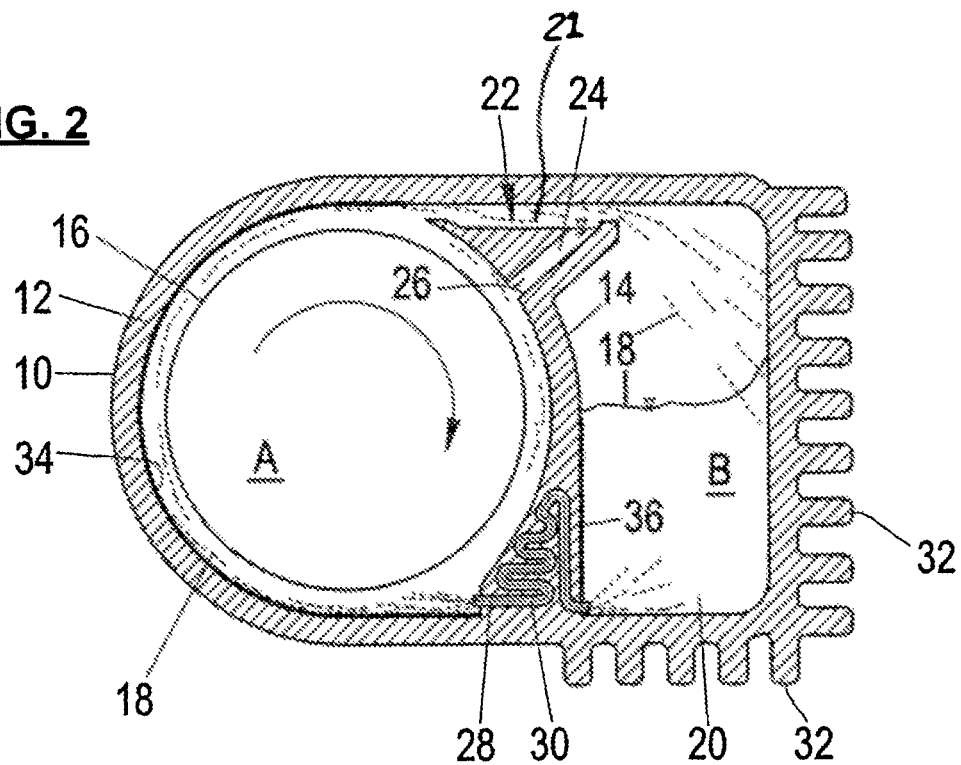
FIG. 2 is a cross-sectional view of a second embodiment of a transmission in accordance with the invention after reaching the optimum operating temperature.

A second embodiment of a transmission in accordance with the invention is shown in FIG. 2 which only differs from the first embodiment shown in FIG. 1 in the design of a lower region of the partition wall 14 and of the passage 28.

The partition wall 14 of the second embodiment shown in FIG. 2 thus has a lower region which is wider viewed in cross-section and in which the passage 28 leading from the liquid lubricant store 20 to the first transmission section A is designed in a labyrinthine manner having a plurality of turns. Due to its labyrinthine design, the passage 28 has an increased throughflow resistance for the liquid lubricant 18, with the resistance for colder, and thus higher viscosity, liquid lubricant 18 being larger than for warmer, and thus lower viscosity, liquid lubricant 18. In this embodiment, the passage 28 itself forms the temperature-controlled restrictor element 30, i.e. no additional restrictor element such as a bimetallic platelet or a magnetic valve is required for the control of the liquid lubricant flow through the passage 28.

Since the passage 28 is never completely closed, a minimum lubrication of the transmission element 16 is ensured without a separate lubrication passage having to be provided for this purpose.

To decouple the lower region of the partition wall 14 having the passage 28 thermally from the colder liquid lubricant 18 stored in the liquid lubricant store 20, the side of the partition wall 14 facing the liquid lubricant store 20 is provided with a thermal insulation layer 36. It is ensured in this manner that the lower region of the partition wall 14 receiving the passage 28 adopts the temperature prevailing in the first transmission section A, and thereby ultimately also the optimum operating temperature of the transmission, at least approximately free of delay and optionally allows a supply of colder liquid lubricant 18.

Figure 3:
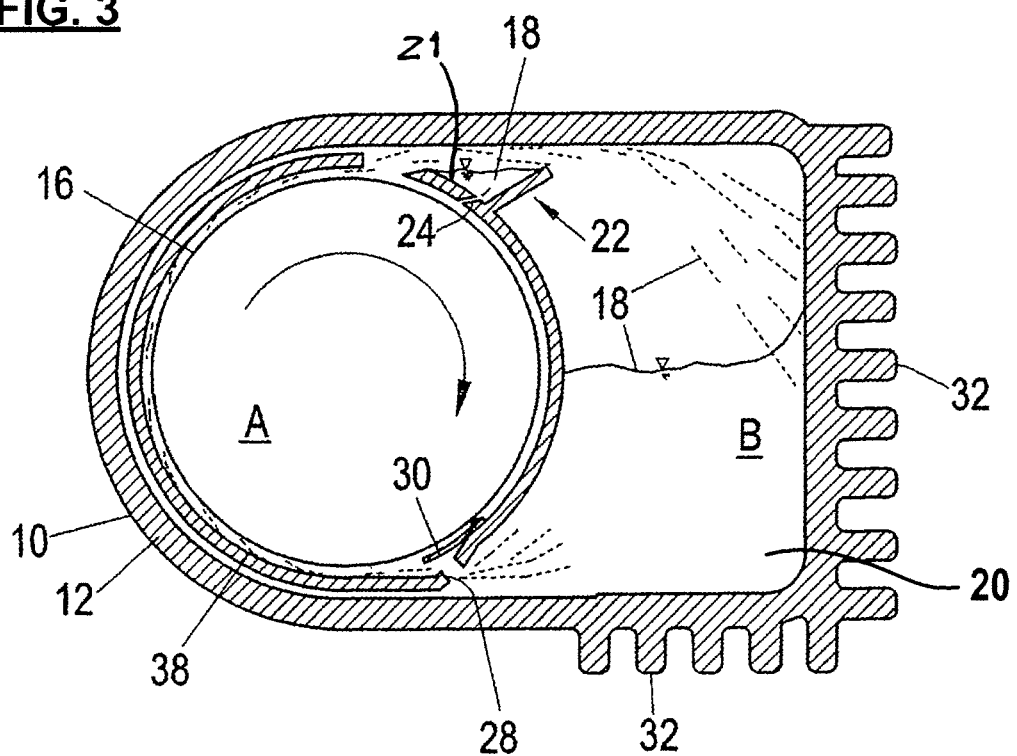
FIG. 3 is a cross-sectional view of a third embodiment of a transmission in accordance with the invention after reaching the optimum operating temperature.

In FIG. 3, a third embodiment of a transmission in accordance with the invention is shown which differs from the first embodiment shown in FIG. 1 in that no partition wall 14 is provided in the housing 10 of the transmission. Instead, the sealing of the first transmission section A with respect to the second transmission section B, and thus with respect to the liquid lubricant store 20, is achieved by an encapsulation 38 formed of plastic or of sheet metal which surrounds the transmission element 16 in the manner of a drum. The encapsulation 38 in this respect simultaneously also provides a thermal insulation of the first transmission section A with respect to the housing wall 12 and with respect to the liquid lubricant 18 stored in the liquid lubricant store 20, with the insulating effect being particularly high when the encapsulation 38 itself is formed from a thermally insulating material.

In a similar manner to the first embodiment shown in FIG. 1, the encapsulation 38 of the third embodiment has a passage 28 in a lower region which is approximately completely closed at temperatures in the first transmission section A lying below a predetermined temperature threshold value by a restrictor element 30 in the form of a bimetallic platelet and is released at temperatures above the temperature threshold value so that cooler liquid lubricant 18 can flow out of the liquid lubricant store 20 into the first transmission section A.

As already mentioned, the restrictor element 30 designed in the form of a bimetallic platelet is also not able to close the passage 28 100% at low temperatures due to the principle used. In this manner, a small quantity of liquid lubricant 18 can always flow into the first transmission section A at temperatures below the temperature threshold value to ensure a minimum lubrication of the transmission element 16. No additional lubrication passage therefore has to be provided in the encapsulation 38 in this embodiment either.

Figure 4:
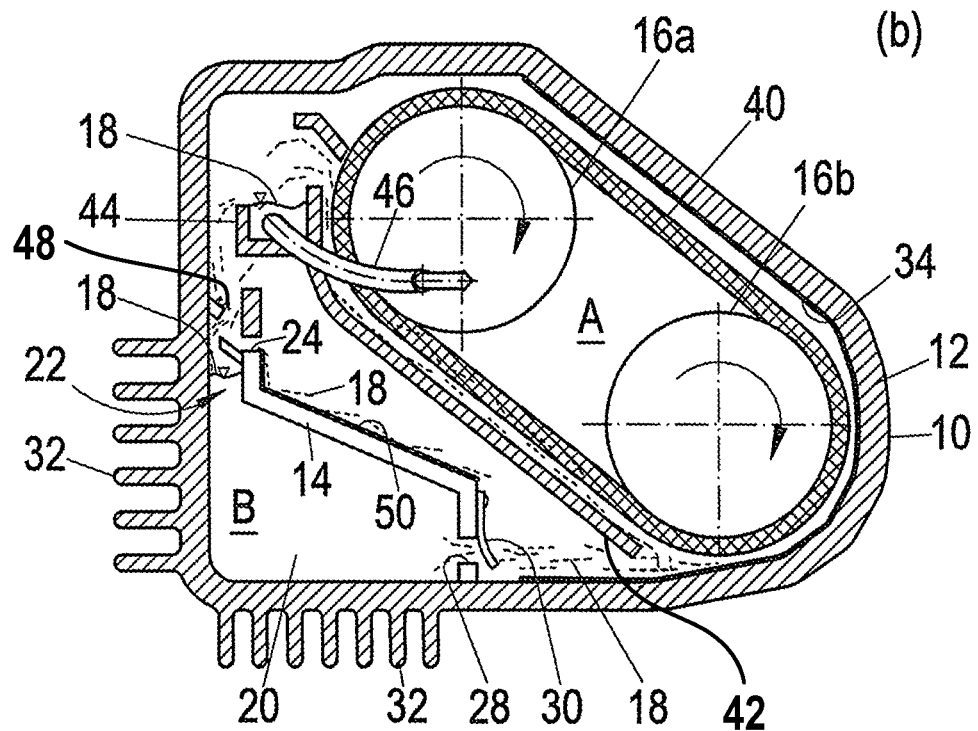
FIG. 4 is a cross-sectional view of a fourth embodiment of a transmission in accordance with the invention (a) before reaching an optimum operating temperature and (b) after reaching the optimum operating temperature.
Figure 4:
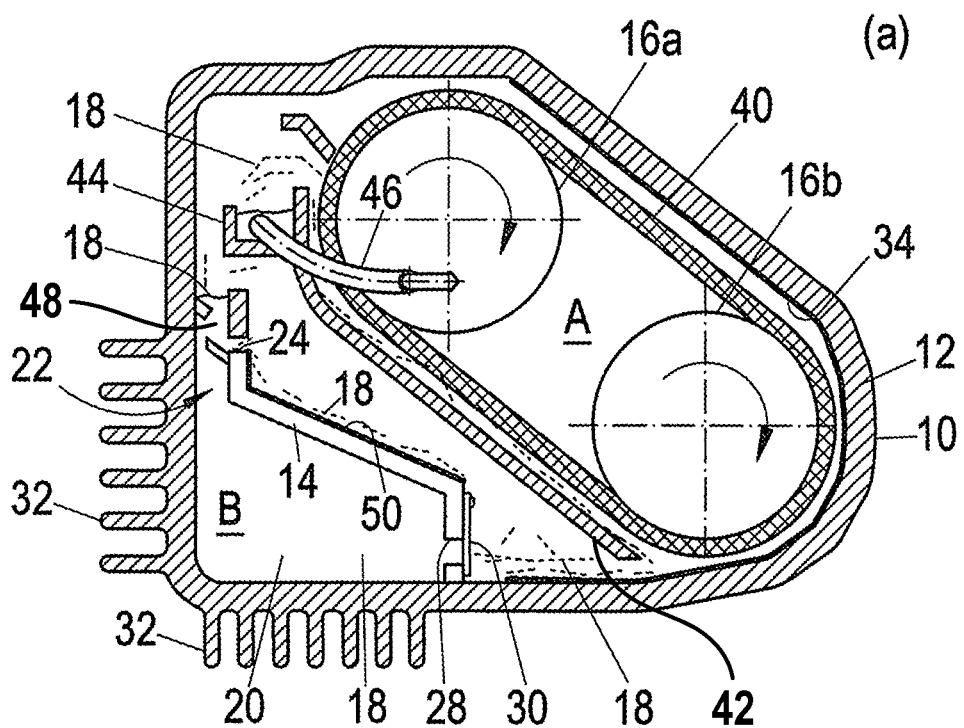

In FIG. 4, a fourth embodiment of a transmission in accordance with the invention is shown which likewise has a housing 10 having a housing wall 12 and a partition wall 14 which divides an inner space of the housing 10 into a first transmission section A and into a second transmission section B.

The transmission in accordance with the fourth embodiment is a transfer case which includes two power-conducting transmission elements 16a, 16b arranged in the first transmission section A and coupled to one another by a chain 40.

The chain 40 is guided in a chain passage which is bounded, on the one hand, by a section of the housing wall 12 and, on the other hand, by a chain passage wall 42.

If the transmission elements 16a, 16b rotate, liquid lubricant 18 is conveyed from a lower region of the first transmission section A by the co-moving chain 40 into an upper region of the transmission section A and is thrown off there. A portion of the thrown off liquid lubricant 18 is collected in a deep tank 44 shaped onto the chain passage wall 42. A portion of the liquid lubricant 18 collected in the deep tank 44 can be supplied, as required, via a line 46 to another transmission part, e.g. to a multidisk clutch.

If the quantity of the liquid lubricant 18 collected in the deep tank 44 exceeds a preset maximum filling level, the liquid lubricant 18 overflows out of the deep tank 44. The liquid lubricant 18 overflowing out of the deep tank 44 is collected by a collection device 22 which is formed in an upper region of the partition wall 14, but is arranged beneath the deep tank 44.

In a similar manner as to the previous embodiments, the collection device 22 of the transmission in accordance with the fourth embodiment also has a return passage 24 such that a basic quantity of collected liquid lubricant 18 always flows back through the return passage 24 directly into the first transmission section and is thus returned to the lubricant circuit in the first transmission section A.

The collection device 22 for this purpose has a labyrinthine design such that a small basin 48 is formed in front of an entrance to the return passage 24 and in which the collected liquid lubricant 18 accumulates in front of a passage through the return passage 24. The same effect is achieved when the liquid lubricant store 20 as shown in FIG. 4a is completely filled so that the liquid lubricant flow into the liquid lubricant store 20 is blocked by the accumulating liquid lubricant 18 itself. The collected liquid lubricant 18 can in this case, as mentioned, flow off through the return passage 24 or via an upper margin in the liquid lubricant store 20 into the first transmission section A.

In a similar manner to the previous embodiments, the partition wall 14 of the transmission in accordance with the fourth embodiment also has a passage 28 which is formed in a lower region of the partition wall 14 and is provided with a restrictor element 30 which approximately closes the passage 28 at temperatures below a temperature threshold value and at least partly releases it at temperatures above the temperature threshold value to allow a flow of liquid lubricant 18 from the liquid lubricant store 20 into the first transmission section A. In a similar manner as to the first embodiment, the restrictor element 30 of the transmission in accordance with a fourth embodiment is formed by a bimetallic platelet.

Since the bimetallic platelet, as already mentioned, can also not completely close the passage 28 at particularly low temperatures due to the principle used and thus a minimal quantity of liquid lubricant 18 also flows out of the liquid lubricant store 20 into the first transmission section A at lower temperatures, no additional passage also has to be provided to ensure a minimum lubrication in the partition wall 14 in the embodiment shown in FIG. 4.

It is self-explanatory that the restrictor element 30 of the transmission in accordance with the fourth embodiment can also alternatively be formed by a labyrinthine shaped passage 28, similar to the passage 28 shown in FIG. 2, or can be formed by a magnetic valve or by a thermostat variant.

To enable a heating of the first transmission section A to the optimum operating temperature which is as fast as possible, an inner side of a section of the housing wall 12 bounding the first transmission section A is lined with a thermal insulation layer 34. A corresponding insulation layer 50 is also provided at a side of the partition wall 14 facing the first transmission section A.

Alternatively, the thermal insulation of the first transmission section A, in a similar manner as shown in FIG. 3, can also take place by the use of an encapsulation of a thermally insulating material or made of plastic or of sheet metal. Such an encapsulation could simultaneously form the chain passage, seal the first transmission section A with respect to the second transmission section B and additionally have the passage 28 and thus integrate all three functions in one component.

In FIG. 5, the time course of the temperature of the first transmission section A (curve I) and of the second transmission section B (curve II) of a transmission in accordance with the invention and of a standard transmission with conventional lubrication and cooling (curve III), as it appears, for example, in a $CO_2$ measurement cycle. In this cycle, the measurement starts with a "cold" condition vehicle, for example at a transmission temperature of 25° C. With the conventional standard transmission, the transmission temperature increases during the measurement up to the end of the measurement cycle in the range of approximately 50° C. (curve III). The standard transmission in this respect never reaches its optimum operating temperature range, or only very late. Consequently, the efficiency of the standard transmission reached during the measurement cycle is also not optimum.

The temperature course in a transmission in accordance with the invention, in contrast, proves to be considerably more favorable since the power-conducting first transmission section A of the transmission in accordance with the invention heats up much faster to higher temperatures (curve I), whereas the second transmission section B, i.e. the liquid lubricant store 20, separate from the first transmission section A remains considerably cooler. As a result, not only better efficiency is thus achieved with the transmission in accordance with the invention, but as a consequence also improved $CO_2$ values or consumption values.

In FIG. 6, the time temperature courses of the first transmission section A (curve I) and of the second transmission section B (curve II) of a transmission in accordance with the invention as well as of a standard transmission with conventional lubrication and cooling (curve III) are shown for a measurement cycle with higher loads.

The star symbolizes the reaching of an optimum operating temperature in the first transmission section A of the transmission in accordance with the invention. After reaching the optimum operating temperature, i.e. from the star onward, the temperature in the first transmission section A is kept as constant as possible via the previously described regulation behavior, i.e. by the temperature controlled supply of cooler liquid lubricant 18 from the liquid lubricant store 20 into the first transmission section A. Due to the amplified backflow of liquid lubricant from the first transmission section A into the liquid lubricant store 20 which accompanies this, liquid lubricant 18 also heats more in the liquid lubricant store 20.

As soon as the energy input into the transmission becomes lower, the standard transmission cools considerably (curve III). A corresponding drop in the temperature can also be noted in the first transmission section A of the transmission in accordance with the invention (curve I). The drop in the temperature in the first transmission section A of the transmission in accordance with the invention is, however, considerably less than in the conventional standard transmission since, in accordance with the invention, a restriction of the flow of liquid lubricant 18 from the liquid lubricant store 20 into the first transmission section A takes place on a fall of the temperature in the first transmission section A or the liquid lubricant flow is even completely suppressed, whereby a faster cooling of the first transmission section A is prevented.

The temperature of the liquid lubricant 18 in the liquid lubricant store 20 of the transmission in accordance with the invention, in contrast, falls more than the temperature of the conventional standard transmission. Since the liquid lubricant store 20 or the second transmission section B of the transmission in accordance with the invention therefore does not contain any power conducting transmission parts, a faster drop of the temperature in this region is of no significance for the efficiency of the transmission in accordance with the invention.

REFERENCE NUMERAL LIST 10 housing
12 housing wall
14 partition wall
16 transmission element
18 liquid lubricant
20 liquid lubricant store
22 collection device
24 return passage
26 orifice
28 passage
30 restrictor element
31 lubrication passage
32 cooling fin
34 insulation layer
36 insulation layer
38 encapsulation
40 chain
42 chain passage wall
44 deep tank
46 line
48 basin
50 insulation layer
A transmission section
B transmission section The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A transmission for a motor vehicle, comprising;
   a transmission element which can be rotated for the transfer of torque and which is arranged in a first transmission section (A) of a transmission housing;
   a store for a liquid for the lubrication and cooling of the transmission element, said store being arranged in a second transmission section (B) of the transmission housing and being separated by a partition wall from the first transmission section (A);
   a collection device for collecting liquid lubricant thrown off by the transmission element, wherein the collection device includes a collection reservoir formed by the partition wall, a distinct return passage formed through the partition wall and through which a first portion of the collected liquid lubricant is returned from the collection reservoir into the first transmission section (A), and an outlet passage to conduct a second portion of the collected liquid lubricant from the collection device into the liquid lubricant store; and
   a passage for the liquid lubricant extending through the partition wall which connects the liquid lubricant store to the first transmission section (A) and which has a temperature controlled restrictor element which substantially prevents the inflow of liquid lubricant from the liquid lubricant store into the first transmission section (A) when a fluid temperature in the first transmission section (A) falls below a temperature threshold value and enables the inflow of liquid lubricant from the liquid lubricant store into the first transmission section (A) when the fluid temperature in the first transmission section (A) exceeds the temperature threshold value.

2. The transmission in accordance with claim 1, wherein the restrictor element is operable to vary the cross-section opening size of the passage based on the fluid temperature in the first transmission section.

3. The transmission in accordance with claim 2, wherein the restriction element is a moveable valve element operable to move relative to the passage.

4. The transmission in accordance with claim 3, wherein the moveable valve element is a bimetallic plate having one end attached to a lower region of the partition wall which divides the transmission housing into the first and second transmission sections, and wherein the collection device is integrated into an upper region of the partition wall.

5. The transmission in accordance with claim 4, wherein a lubrication passage is formed through the partition wall and is located between the return passage of the collection device and the passage associated with the moveable valve element.

6. The transmission in accordance with claim 1, wherein a minimal internal cross-section of the return passage in the collection reservoir is defined by an orifice which is located to be independent of the temperature.

7. The transmission in accordance with claim 1, wherein the collection device is arranged in an upper region of the transmission so as to be located in the region of an upper section of the transmission element and above the lubricant liquid store.

8. The transmission in accordance with claim 1, wherein the passage connecting the liquid lubricant store to the first transmission section (A) is arranged in a lower region of the transmission.

9. The transmission in accordance with claim 1, wherein the quality of liquid lubricant present in the liquid lubricant store is greater than the quantity of liquid lubricant present in the first transmission section (A).

10. The transmission in accordance with claim 1, wherein the liquid lubricant store is partly bounded by a wall of the transmission housing provided with cooling fins.

11. The transmission in accordance with claim 1, wherein the first transmission section (A) has a thermally insulating material, and wherein a wall of the transmission housing bounding the first transmission section (A) is lined at least regionally with the thermally insulating material.

12. The transmission in accordance with claim 1 further including a second passage which connects the liquid lubricant store to the first transmission section (A), and wherein the second passage is formed in the partition wall between the first transmission section (A) and the second transmission section (B).

13. A transmission, comprising;
   a housing having an interior divided by a partition wall into a first transmission section and a second transmission section;
   a transmission element disposed for rotation within the first transmission section;
   a store of liquid for lubricating and cooling the transmission element arranged in the second transmission section;
   a collection device including a reservoir for collecting liquid thrown off by the transmission element and associated with an upper portion of the partition wall of the housing, the collection device further including a distinct return passage extending through the partition wall and through which a first portion of the collected liquid in the reservoir is conveyed to the first transmission section, and an outlet passage through which a second portion of the collected liquid in the collection device is conveyed to the second transmission section; and
   a passage located at a lower portion of the housing and which extends through the partition wall between the first and second transmission sections, the passage having a temperature dependent restrictor element which inhibits the flow of liquid from the second transmission section into the first transmission section when the liquid within the first transmission section has a fluid temperature below a threshold value and enables the flow of liquid from the second transmission section into the first transmission section when the liquid in the first transmission section has a fluid temperature exceeding the threshold value.

14. The transmission of claim 13 wherein the passage is formed through a lower portion of the partition wall, and wherein the restrictor element includes a bimetallic element operable to vary the cross-section opening size of the passage based on the fluid temperature in the first transmission section.

15. The transmission of claim 13 further including a lubrication passage located at an intermediate portion of the housing between the collection device and the temperature dependent restrictor element.

16. A transmission, comprising:
   a housing having an interior divided by a partition wall into a first transmission section and a second transmission section;

a transmission element disposed for rotation within the first transmission section;

a store of liquid for lubricating and cooling the transmission element arranged in the second transmission section;

a collection device including a collection reservoir for collecting liquid thrown off by the transmission element and associated with a first portion of the partition wall, the collection device further including a distinct return passage extending through the partition wall and through which a first portion of the collected liquid is conveyed from the collection reservoir to the first transmission section, and an outlet passage through which a second portion of the collected liquid is conveyed from the collection device to the second transmission section; and a passage extending through a second portion of the partition wall between the first and second transmission sections, the passage having a temperature dependent restrictor element which inhibits the flow of liquid from the second transmission section into the first transmission section when the liquid within the first transmission section has a fluid temperature below a threshold value and enables the flow of liquid from the second transmission section into the first transmission section when the liquid in the first transmission section has a fluid temperature exceeding the threshold value.

17. The transmission of claim 16 wherein the restrictor element includes a bimetallic valve element having a first portion fixed to the second portion of the partition wall and a second portion moveable relative to the passage based on the fluid temperature of the liquid in the first transmission section.

18. The transmission of claim 16 further including a lubrication passage extending through the partition wall between the return passage of the collection device and the passage having the restrictor element.

* * * * *